United States Patent [19]

Fex

[11] Patent Number: 4,896,729
[45] Date of Patent: Jan. 30, 1990

[54] APPARATUS FOR COLLECTING POTATOES AND OTHER ROOT VEGETABLES

[76] Inventor: Maurice Fex, 2746 Dominion Drive, Blezard Valley, Ontario, Canada, P0M 1E0

[21] Appl. No.: 209,068

[22] Filed: Jun. 20, 1988

[30] Foreign Application Priority Data

Jun. 18, 1987 [CA] Canada ............................ 540066

[51] Int. Cl.$^4$ .......................................... A01D 13/00
[52] U.S. Cl. ...................................... 171/84; 171/102
[58] Field of Search ...................... 171/102, 19, 47, 56, 171/60, 67, 70, 86, 92, 84; 172/29, 30

[56] References Cited

U.S. PATENT DOCUMENTS

| | | | |
|---|---|---|---|
| 1,763,422 | 6/1930 | Dolling | 171/56 |
| 2,016,564 | 10/1935 | Voekel | 56/328 R |
| 2,787,876 | 4/1957 | Cole | 171/47 |
| 3,053,327 | 9/1962 | Van den Munckhof | 171/88 |
| 3,578,088 | 5/1971 | Raath | 171/60 |
| 3,626,677 | 12/1971 | Sides | 56/328 R |
| 3,863,430 | 2/1975 | Jennings | 56/345 |
| 3,921,785 | 11/1975 | Huitink | 198/8 |
| 3,961,469 | 6/1976 | McRobert | 56/328 R |
| 3,981,127 | 9/1976 | Smith | 56/328 R |

FOREIGN PATENT DOCUMENTS

| | | |
|---|---|---|
| 460835 | 11/1949 | Canada . |
| 556788 | 5/1958 | Canada . |
| 581870 | 8/1959 | Canada . |
| 606843 | 10/1960 | Canada . |
| 71312 | 7/1950 | Denmark ............... 171/56 |
| 905088 | 6/1944 | France ................... 171/56 |

Primary Examiner—Robert E. Garrett
Assistant Examiner—Therese M. Newholm
Attorney, Agent, or Firm—Robert M. Phipps

[57] ABSTRACT

An apparatus is described herein for gathering vegetables such as potatoes and other root vegetables from a plurality of rows into a central region for subsequent harvesting. The apparatus includes a support frame structure adapted to be secured to a tractor. A pair of wings are secured to the frame and they are adapted to extend, when in use, laterally outwardly relative to the forward direction of travel of the tractor. Each of these wings includes an endless flexible tine carrier mounted thereon for travel in an endless path, such path of travel including an upper run and a lower run. A plurality of tines are secured to and project outwardly in spaced relationship to each other from the flexible tine carrier for movement along the above-noted path of travel. Thus, during use, the tines located along the lower run of the path of travel are capable of engaging the vegetables lying on or in the earth. Suitable drive means are connected to the endless tine carriers for moving them along their associated paths of travel in opposed directions. Thus, the vegetables so engaged by the tines are gathered together toward a region between the above-noted wings for subsequent harvesting.

10 Claims, 5 Drawing Sheets

APPARATUS FOR COLLECTING POTATOES AND OTHER ROOT VEGETABLES

BACKGROUND OF THE INVENTION

This invention relates to apparatus for the gathering or collecting of potatoes or other root vegetables, such as turnips, carrots and the like.

The prior art has provided various types of potato digging machines, which machines dig one or more rows of potatoes, leaving the bulk of the potatoes lying on or close to the surface of the earth. The potatoes were then harvested by any suitable means. Years ago such potatoes were commonly harvested by hand but in more recent years machines have been developed for harvesting the potatoes.

In the course of harvesting potatoes, it has been common practice to use a machine called a "one-over" which is attached to a secondary tractor that precedes the harvester during use. The function of this "one-over" machine is to pick up two rows of the product (e.g. potatoes) and to place the product into the path of the harvester.

A major disadvantage of the conventional "one-over" apparatus is that it requires a secondary tractor to pull it, thus requiring an extra tractor and an extra man to operate it.

SUMMARY OF THE INVENTION

It is an object of the present invention to provide apparatus for collecting or gathering vegetables, such as potatoes and the like, which apparatus preferably forms an attachment to the main tractor which is used to pull the harvester.

Another object of the invention is to provide apparatus for attachment to a tractor, which apparatus collects and transfers one or more extra rows of various farm products, especially potatoes, into the path of a harvester, e.g. a single or a double row harvester. Any reasonable number of rows can be gathered and collected together by this apparatus. For example, when using a double row harvester, two or more extra rows of potatoes can be collected and gathered by this apparatus.

Accordingly, the invention provides apparatus for gathering vegetables such as potatoes and other root vegetables from a plurality of rows into a central region for subsequent harvesting. The apparatus includes a support frame structure adapted to be secured to a tractor. A pair of wings are secured to the frame and they are adapted to extend, when in use, laterally outwardly relative to the forward direction of travel of the tractor. Each of these wings includes an endless flexible tine carrier mounted thereon for travel in an endless path, such path of travel including an upper run and a lower run. A plurality of tines are secured to and project outwardly in spaced relationship to each other from the flexible tine carrier for movement along the above-noted path of travel. Thus, during use, the tines located along the lower run of the path of travel are capable of engaging the vegetables lying on or in the earth. Suitable drive means are connected to the endless tine carriers for moving them along their associated paths of travel in opposed directions. Thus, the vegetables so engaged by the tines are gathered together toward a region between the above-noted wings for subsequent harvesting.

The flexible tine carriers preferably each include an endless flexible belt supported from a spaced pair of drums which, in turn, are rotatably mounted to an associated one of the wings.

The drive means are operatively connected to the drums to rotate the same and thus effect the movement of the belts along their paths of travel. The drive means preferably includes a hydraulic motor and a chain and sprocket means for operatively connecting the hydraulic motor to the drum support shaft. Suitable means can be provided for varying the speed of the hydraulic motor thereby to best suit the prevailing conditions.

Each of the above-noted wings preferably comprises a sub-frame which is pivotally secured to the support frame for movement between raised inoperative positions and lowered operative positions. Wheel means may be located at the outer end of each of the wings for supporting the wings in the lowered operative positions. Adjustment means may be associated with the wheel means to enable the lowered operative positions of the wings to be adjusted accordingly.

Powered means may be provided for pivoting the wings between the lowered and raised positions.

As a further feature, plough share-like elements are secured to the wings for loosening the soil in advance of the passage of the tines during forward motion of the tractor. This serves to loosen the soil thereby enabling a more effective and efficient operation of the tines during the gathering process.

The above-noted support frame is preferably adapted to be fixed directly to the tractor. Preferably, the support frame is fixed to the tractor forwardly of the rear wheels of the tractor so that the wings are positioned between the front and rear wheels of the tractor on opposing sides of the tractor so that the operation of the tines and tine carriers can be easily observed.

The improved vegetable gathering and collecting apparatus of the present invention includes other features and advantages which will be readily apparent from the following more detailed description of a preferred embodiment of the invention taken in conjunction with the appended drawings.

BRIEF DESCRIPTION OF THE VIEWS OF DRAWINGS

DETAILED DESCRIPTION OF THE PREFERRED EMBODIMENT

Figure 1:
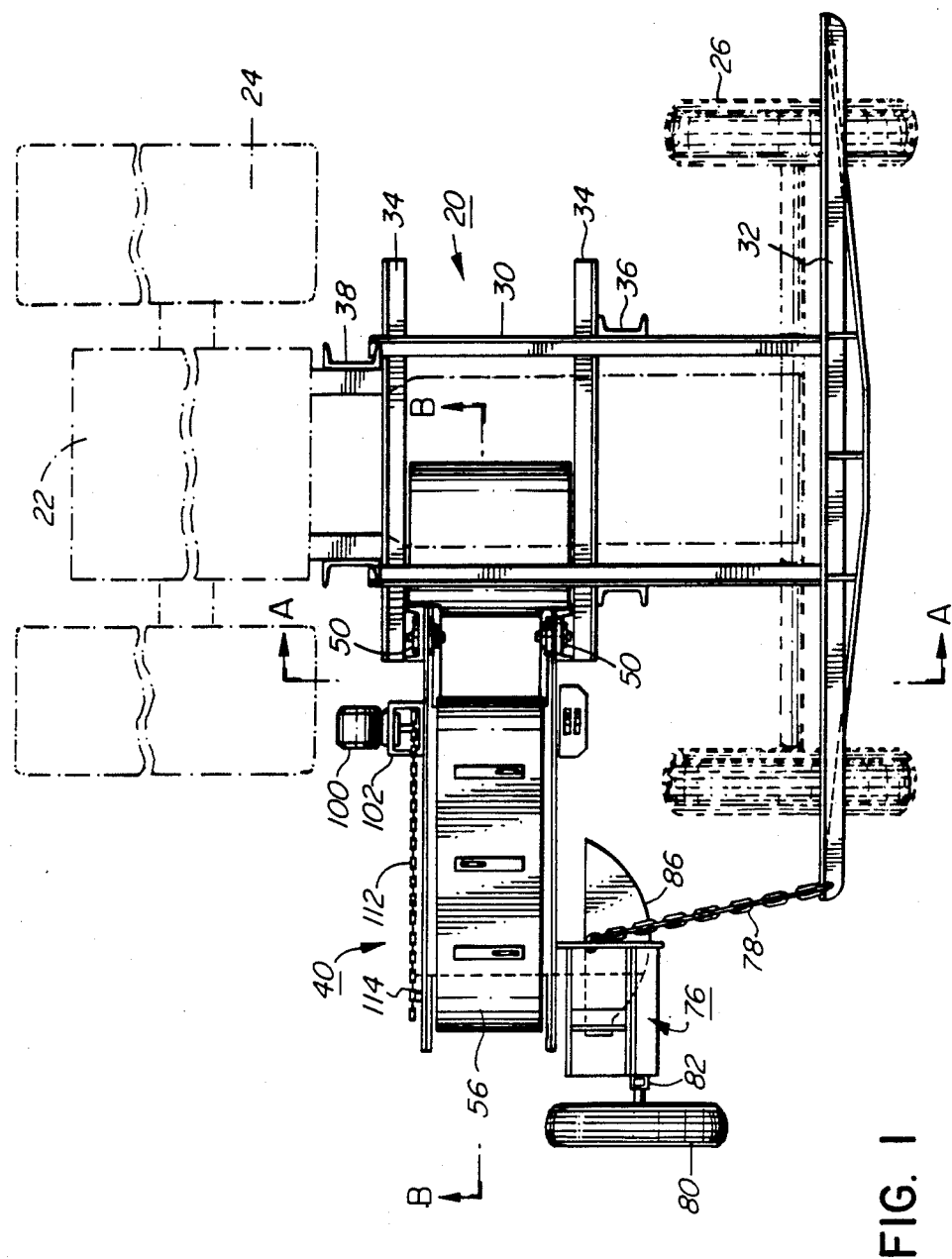
FIG. 1 is a plan view of the vegetable collecting and gathering apparatus in accordance with an embodiment of the present invention illustrating the apparatus as connected to a tractor, the tractor being shown in phantom.

Referring now to the drawings in detail, an embodiment of the invention is shown including a support frame 20 adapted to be secured to a conventional farm tractor 22. The farm tractor includes the usual large diameter rear wheels 24 and smaller diameter front wheels 26. The main body, or frame, of the tractor is designated by reference numeral 28.

The support frame 20 includes a pair of longitudinally extending members 30 which, during use, are disposed in flanking relationship to the tractor body 28. The forwardly disposed ends of frame members 30 are securely connected, as by welded brackets and the like, to a transverse member 32, the opposing ends of transverse member 32 extending slightly outwardly of and being disposed slightly above the front wheels of the tractor 26.

The support frame 20 includes a pair of transversely extending frame members 34, frame members 34 being in parallel relationship to one another and being spaced apart in the longitudinal direction, one such transverse member 34 being located toward the rear end of the support frame while the other transverse member 34 is located in the intermediate region of the support frame.

Figure 2:
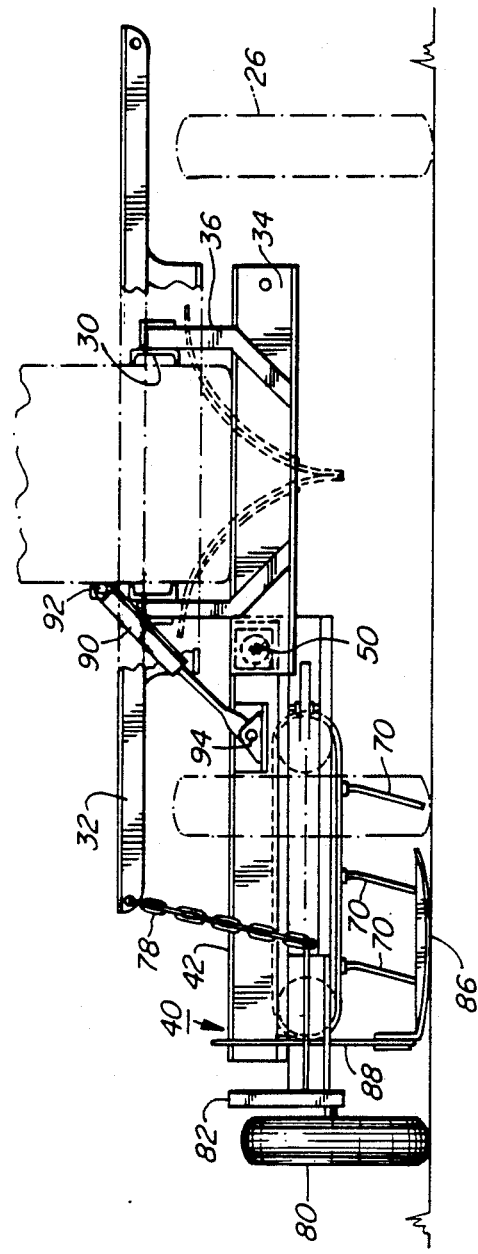
FIG. 2 is a front elevation view of the apparatus of FIG. 1.

The transverse frame members 34 are connected to the longitudinal frame members 30 by means of vertically disposed front and rear channel members 36 and 38. The connections between the various frame members is such that the transverse frame members 34 are located a distance below the longitudinal frame members 30 as clearly illustrated in FIG. 2. The upper end portions of the front and rear vertical frame channel members 36 and 38 are fixed to the tractor body 28 by any suitable means such as bolts, etc. Since the dimensions of various makes of tractors vary considerably, it may be necessary to weld suitable support brackets to appropriate locations on the tractor body and/or to provide additional brackets on the front and rear vertical frame members 36 and 38 thereby to provide for a firm and secure mounting.

It was noted previously that a pair of wings are secured to the support frame such that they extend laterally outwardly relative to the forward direction of travel of the tractor. In an actual embodiment, one such wing extends outwardly from both sides of the tractor but in the attached drawings, only one such wing is illustrated for purposes of simplicity. However, it should be realized that the apparatus is in fact symmetrical about a vertical plane passing through the longitudinal axis of the tractor.

Figure 6:
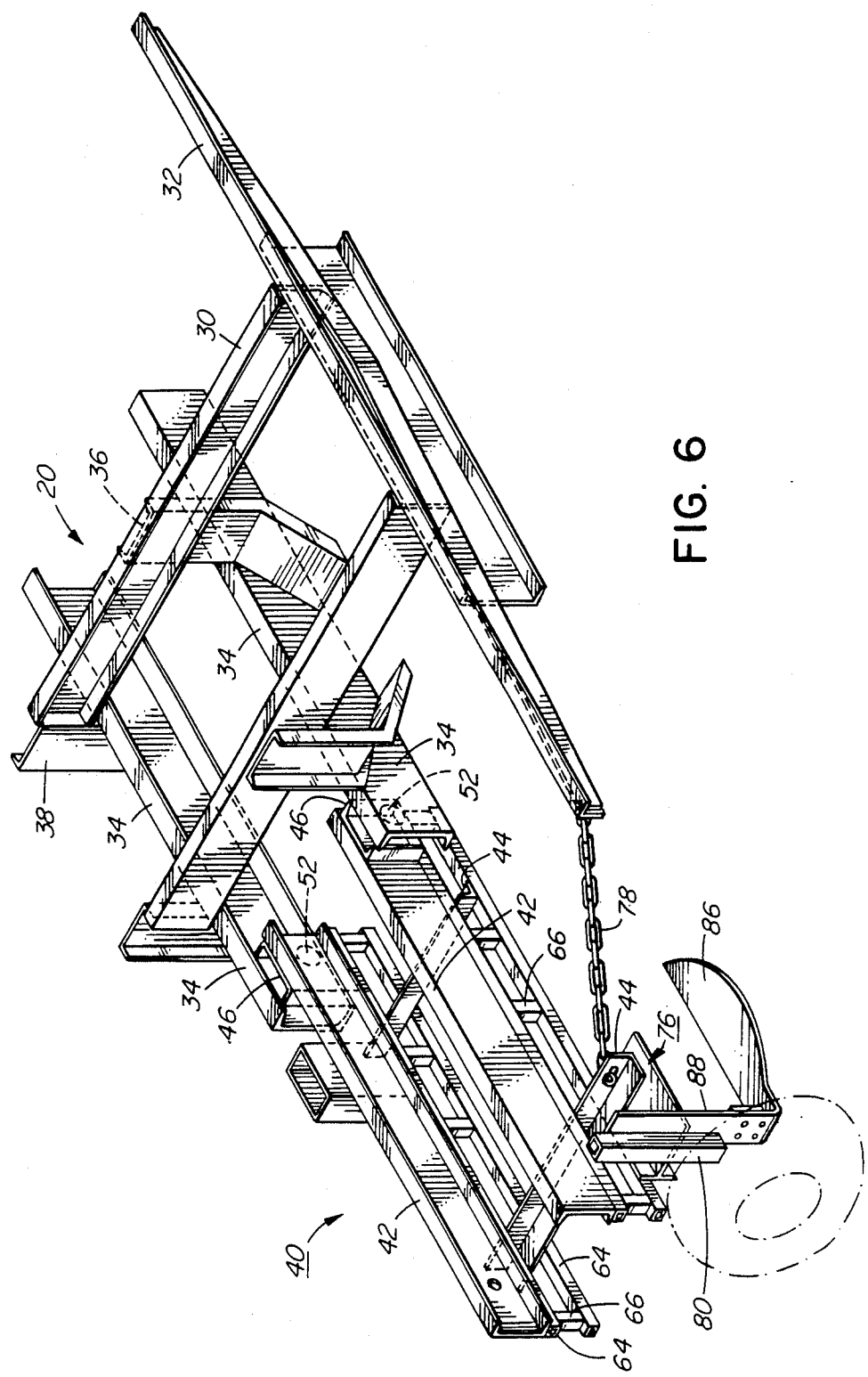
FIG. 6 is a perspective view of a portion of the frame assembly of the apparatus shown in FIG. 1 etc.

As illustrated in the drawings, each wing 40 comprises a spaced parallel pair of wing frame members 42 as best seen in FIG. 6. These members 42 are secured in spaced parallel relationship by transversely extending frame members 44. The outermost ends of the transverse frame members 34 are provided with pivot brackets 46, these pivot brackets 46 being spaced apart so as to snugly receive between them the inner ends of the wing frame members 42. A pair of stub pivot shafts 50 (see FIGS. 1 and 2) extend through the adjacent ends of the wing frame members 42, through the outer ends of the transverse frame members 34 and the associated pivot brackets 46 thereby permitting each wing 40 to pivot upwardly or downwardly relative to the support frame 20. The pivot axis defined by the hinge structure described above is designated by reference numeral 52.

Each of the wings 40, as noted previously, is provided with an endless flexible tine carrier 56 in the form of an endless flexible belt which travels in an endless path of travel defined by an opposed pair of drums 58 mounted in spaced apart parallel relationship to and just below the wing frame members 42. These belt drums 58 are mounted for rotation on associated drum shafts 60 which, in turn, are mounted in opposed bearing blocks 62 which are disposed between upper and lower wing frame elements 64, the latter comprising tubular members, the upper ones of which are securely welded to the associated wing frame members 42 while the lower ones are secured to the upper tubular elements in spaced parallel relationship by means of spacer members 66. The outer bearing blocks 62 are fixed in position, but the inner bearing blocks can be slid to and from by means of a threaded adjustment device 68 comprising a threaded stud secured to each of the bearing blocks, such stud passing through a plate fixed to the wing frame members and having opposing nuts threaded on such shaft and located on opposing sides of the plate thereby to enable the inner bearing blocks to be moved toward or away from the outer bearing blocks 62. In this way, the degree of tension in the flexible tine carrier 56 can be varied.

The flexible tine carrier comprises an endless section of heavy duty conveyor-type belting, preferably having a thickness of about ⅜ of an inch or greater and having an impervious outer coating of rubber thereby to resist wear. Heavy duty belting of this nature is of course readily available commercially.

Figure 3:
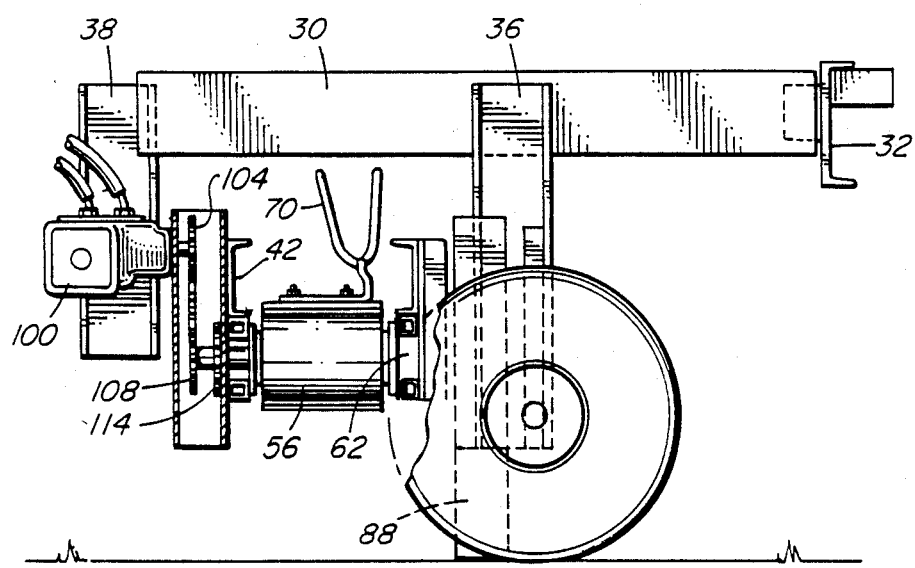
FIG. 3 is a side elevation view thereof.
Figure 4:
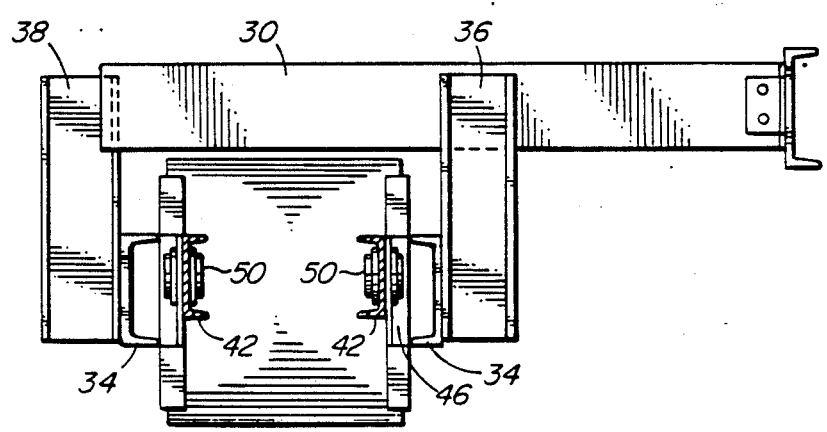
FIG. 4 is a partial sectional view taken along line A—A of FIG. 1.
Figure 5:
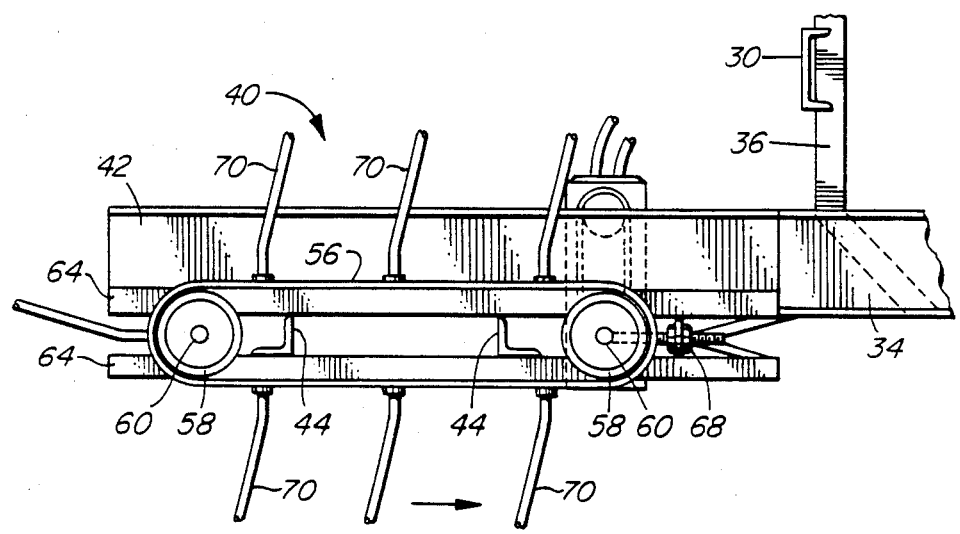
FIG. 5 is a longitudinal section view taken along line B—B of FIG. 1.
Figure 7:
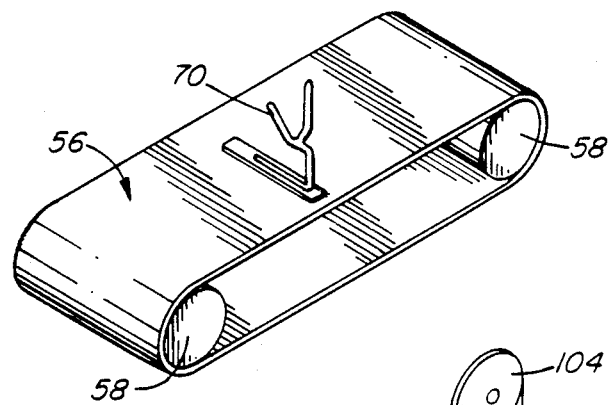
FIGS. 7 and 8 are perspective diagrammatic views of the tine carrier and tine carrier drive assemblies, respectively.
Figure 8:
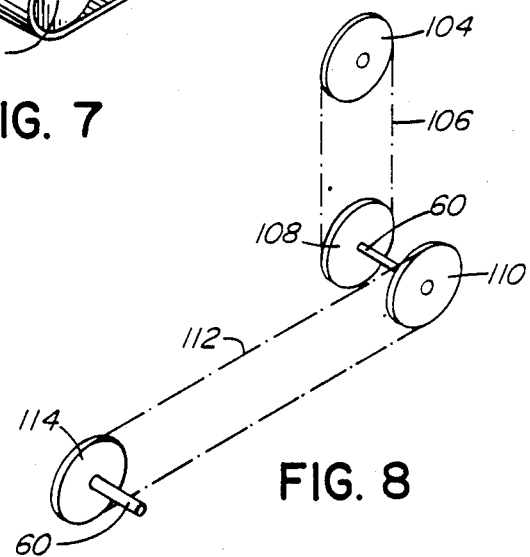

The tines 70 are bolted to the tine carrier 56 in spaced apart relationship as best illustrated in FIGS. 3 and 5. The tines 70 preferably comprise fork-like elements, each having at least a pair of fingers thereby to firmly engage the potatoes or other vegetables being harvested. The tines are of course made of a long-wearing metal such as a suitably tempered steel. The attachment portion 72 of each tine is formed as a relatively wide elongated flat strip which rests directly on the belt surface. A plurality of suitable bolts or rivets extend through this attachment portion 72 thereby to secure the same firmly to the belt, suitable strips or washers (not shown) being provided so as to bear against the inner surface of the belt thereby to assist in preventing such fastening means from being pulled through the belt when pressure is exerted on the tines 70 during use. It should also be noted in connection with the tines 70 that they are located in alternate positions along the belt as best illustrated in FIG. 1. This alternate or staggered arrangement ensures that as the flexible tine carrier 56 is moved, the tines 70 effectively sweep out an area corresponding to the width of the belt. The length of the tines is not oritical but it will be seen from FIG. 3 that in a typical operation, with the wings 40 in the lowered generally horizontal operating positions, that the lower extremities of the tines should be disposed so as to just make contact with a level surface on which the tractor is resting.

Since the wings 40 are subjected to a substantial amount of rearwardly directed "drag" force, means are provided to counteract this force. Accordingly, the outer end of each wing 40 is provided with a sub-frame 76, to which is attached a chain 78, the forward end of each chain 78 being connected to the outer end of the previously described transverse frame member 32. The flexible chain 78 allows the wing 48 to be raised and lowered while at the same time these rearwardly directed drag forces, which might otherwise exert undue stress on the support frame, are substantially taken up by the transverse frame member 32.

The above-noted sub-frame 76, which is rigidly welded to the forward wing frame member 42, is provided with a support wheel 80. A wheel adjustment means 82 is provided, the same being well known, per se, in agricultural equipment, for permitting the elevation of the outer end of the wing 40, in the lowered operative position, to be adjusted as desired to achieve the best result. This sub-frame 76 also serves to support a generally horizontally extending plough share-like member 86. Member 86 is secured to sub-frame 76 via a vertically disposed support member 88 which is bolted to the sub-frame 76. A number of bolt holes can be provided so that the vertical position of member 86 can be adjusted relative to the sub-frame 76 and the wing 40. The plough share-like element 86 is a generally horizontally disposed flat plate having an accurately curved forward edge. This member 86 is located in advance of the paths of travel of the tines 70 as the apparatus is moved forwardly. During operation the member 86 is located below the surface of the earth in the rows of potatoes and thus it serves to loosen the earth somewhat thus making it easier for the tines 70 to dislodge the potatoes or other vegetables being collected while at the same time putting less stress on the tines and on the flexible belt which defines the flexible tine carrier 56.

Since it is desirable to be able to easily raise and lower the wing members 40, each wing 40 is provided with a hydraulic cylinder 90, the upper end of which is pivotally attached to a suitable bracket 92 affixed directly to support frame 20 while the lower end of the hydraulic cylinder assembly 90 is secured to a bracket 94 which in turn is affixed to the wing frame members 42.

In order to drive the flexible tine carriers 56 and the attached tines 70, each wing 40 is provided with a hydraulic motor 100 mounted to the adjacent wing frame member 42 via a chain and sprocket enclosure 102. The hydraulic motor 100 is provided with a suitable output shaft and sprocket 104, sprocket 104 being connected via link chain 106 to a further sprocket 108 which is fixedly mounted to the outer end of the innermost drum shaft 60. Also mounted on the same drum shaft 60 is a further sprocket 110, the latter being connected by way of a further drive chain 112 (see FIG. 1) to a still further sprocket 114 secured to an outwardly projecting end of the outermost drum shaft 60. For safety purposes, the various sprockets and drive chains should be provided with shields. The hydraulic motor 100 receives a supply of hydraulic fluid through a speed control valve (not shown) of any commercially available design with the hydraulic power being ultimately derived from the hydraulic pump which is normally incorporated in the tractor.

In operation, the wings 40 are lowered downwardly into their generally horizontal operating positions until the support wheels 80 contact the ground. The hydraulic motor 100 is activated thus causing the drums 58 to be rotated thus causing the flexible tine carrier 56 and the attached tines 70 to move thereby to cause the tines 70 to enter into the soil and to engage the potatoes or other vegetables located in the rows to sweep them into a region located between the wings 40 and disposed generally centrally relative to the moving tractor. At the same time, the plough share-like elements 86 loosen the soil in the rows thus providing for more effective operation of the tines 70 and reducing the forces thereon. The operator closely observes the operation and adjusts the forward speed of the tractor and/or the speed of the hydraulic motors 100 thereby to achieve the best combination of forward travel speed and lateral tine travel speed to achieve the most efficient operation possible under the circumstances.

The vegetables as thus gathered into the central region are subsequently collected by a suitable harvesting apparatus (not shown) which is usually towed directly behind the tractor 22.

A preferred embodiment of the invention has been described for purposes of illustration. Since numerous modifications and changes will readily occur to those skilled in the art, the invention should not be limited to the exact construction and operation shown and described and accordingly all suitable modifications and equivalents may be resorted to, falling within the scope of the invention as claimed.

I claim:

1. Apparatus for gathering vegetable such as potatoes and other root vegetables from a plurality of rows into a central region for subsequent harvesting, comprising:
   a support frame structure adapted to be secured to a tractor;
   a pair of wings secured to said frame and adapted to extend, in use, laterally outwardly relative to the foward direction of travel of the tractor;
   each of said wings having an endless flexible tine carrier mounted thereto for travel in an endless path of travel, said path of travel including an upper run and a lower run;
   a plurality of permanently aligned tines secured to and projecting outwardly from the flexible tine carrier for movement along said path of travel such that, when in use, the tines located along said lower rung of the path of travel are capable of engaging the vegetables lying on or in the earth; and
   drive means connected to said endless tine carriers for moving the latter along their respective paths of travel in opposed directions such that the vegetables while still in the ground in which they were grown as well as vegetables on the ground are engaged by said tines and gathered together toward a region between said wings for subsequent harvesting.

2. Apparatus as in claim 1 wherein each said flexible tine carrier comprises an endless flexible belt supported from a spaced pair of drums rotatably mounted to an associated one of said wings.

3. Apparatus as in claim 2 wherein said drive means are operatively connected to said drums to rotate the same and thus effect the movement of said belt along the path of travel.

4. Apparatus according to claim 1 wherein each of said wings comprises a sub-frame which is pivotally secured to said support frame for movement between raised inoperative positions and lowered operative positions.

5. Apparatus according to claim 4 including wheel means located at outer ends of said wings for supporting said wings in said lowered operative positions.

6. Apparatus as in claim 4 including means for pivoting said wings between said lowered and raised positions.

7. Apparatus as in claim 1 including share elements secured to said wings for loosening the soil in advance of said tines during forward motion of the tractor.

8. Apparatus as in claim 1 wherein said drive means comprises a hydraulic motor and chain and sprocket means operatively connecting said hydraulic motor to said endless tine carriers.

9. Apparatus as in claim 1 wherein said support frame is adapted to be fixed directly to the tractor.

10. Apparatus as in claim 1 wherein said support frame is adapted to be fixed directly to the tractor forwardly of the rear wheels of the tractor such that said wings are located between the front and rear wheels of the tractor.

* * * * *